(12) United States Patent
Esfahany (10) Patent No.: US 7,234,072 B2
(45) Date of Patent: Jun. 19, 2007

(54) METHOD AND SYSTEM FOR MAKING AN APPLICATION HIGHLY AVAILABLE

(75) Inventor: Kouros H. Esfahany, Huntington, NY (US)

(73) Assignee: Computer Associates Think, Inc., Islandia, NY (US)

( * ) Notice: Subject to any disclaimer, the term of this patent is extended or adjusted under 35 U.S.C. 154(b) by 520 days.

(21) Appl. No.: 10/418,459

(22) Filed: Apr. 17, 2003

(65) Prior Publication Data
US 2004/0210895 A1 Oct. 21, 2004

(51) Int. Cl.
G06F 11/00 (2006.01)
G06F 9/445 (2006.01)
G06F 15/177 (2006.01)
G06F 13/00 (2006.01)
G06F 9/44 (2006.01)
G06F 15/173 (2006.01)

(52) U.S. Cl. ............... 714/1; 714/2; 717/174; 717/171; 709/220; 709/223; 709/224; 719/328

(58) Field of Classification Search ............... None
See application file for complete search history.

(56) References Cited

U.S. PATENT DOCUMENTS

| 6,101,508 | A  | * | 8/2000 | Wolff ................... 709/223 |
| 6,178,529 | B1 | * | 1/2001 | Short et al. ............. 714/51 |
| 6,192,401 | B1 | * | 2/2001 | Modiri et al. ........... 709/220 |
| 6,681,390 | B2 | * | 1/2004 | Fiske ................... 717/173 |
| 6,725,261 | B1 | * | 4/2004 | Novaes et al. ........... 709/220 |
| 6,839,752 | B1 | * | 1/2005 | Miller et al. ........... 709/224 |
| 2002/0091814 | A1 | * | 7/2002 | Arendt et al. ........... 709/223 |
| 2002/0178396 | A1 | * | 11/2002 | Wong et al. ............. 714/4 |
| 2002/0184555 | A1 | * | 12/2002 | Wong et al. ............. 714/4 |

OTHER PUBLICATIONS

Joe Greenseid, Linux Clustering Software, Jun. 2002, Freshmeat, http:/freshmeat.net/articles/viwe/458/.*
Stefano Martinelli, Installing and Managing Linux Clusters, Feb. 5, 2002, Laboratorio di maggia Cluster Linux, Cineca Consorzio Interuniversitaria.*
Linux HA, Release 1 Linux-HA Fact Sheet, 1999, http://linux-ha.org/FactSheet.*
Linux HA, Release 2 Linux-HA Fact Sheet, 1999, http://linux-ha.org/FactSheetv2.*
Blackmon-Nguyen, High-Availability File Server with Heartbeat, Sep. 2001, Sys Admin Magazine, http://www.samag.com/documents/s=1145/sam0109c/0109c.htm.*
Volker Wiegand, Linux-HA Hardware Installtion Guideline, 1999, http://cvs.linux-ha.org/viewcvs/viewcvs.cgi/linux-ha/doc/HardwareGuide.html?rev=1.3.*
Andrew Blais, Beowulf cluster: epluribus unum Measuring and implementing multiple parallel CPUs, Sep. 1, 2001, http://www-128.ibm.com/developerworks/linux/library/l-beow.html.*

(Continued)

Primary Examiner—Antony Nguyen-Ba
(74) Attorney, Agent, or Firm—Baker Botts L.L.P.

(57) ABSTRACT

A method and system for making an application highly available within a clustered environment includes detecting a cluster on an installation node, verifying whether at least one application component can be installed on the detected cluster, installing the at least one application component on the detected cluster, modifying the at least one application component, and putting the at least one application component online.

91 Claims, 6 Drawing Sheets

OTHER PUBLICATIONS

"1.4. Characteristics that permit an Application to be Highly Available," Linux FailSafe™ Programmer's Guide, http://oss.sgi.com/projects/failsafe/docs/LnxFailSafe_PG/html/le56070-parent.html, 1 page, undated year.

Ingleson, "Deploying Microsoft Cluster Server; Installing applications on the cluster," Windows & .NET Magazine Network, 4 pages, Aug. 2000.

Ingleson, "Deploying Microsoft Cluster Server; You can Increase NT's reliability," Windows & .NET Magazine Network, 3 pages, Aug. 2000.

"Unicenter Network and Systems Management High Availability Option; Getting Started 1.0," Computer Associates International, Inc. (CA), pp. 1-10, 2002.

\* cited by examiner

METHOD AND SYSTEM FOR MAKING AN APPLICATION HIGHLY AVAILABLE

BACKGROUND

1. Technical Field

The present disclosure relates to computer systems. More specifically, the present disclosure relates to a method and system for making an application highly available.

2. Description of the Related Art

As mission-critical eBusiness applications increase, there is a greater demand for solutions to minimize downtime of a computer system. To meet this demand, organizations may employ cluster solutions. A cluster is based on the principle of hardware redundancy and consists of two or more independent servers that are managed as a single system for increased availability, easier manageability and greater scalability.

High availability is used to describe the service that clusters provide. A highly available application is an application that is managed or monitored by a cluster and is continuously operational for a long length of time. A cluster may maintain applications, such as web servers, databases, etc. with nearly zero downtime. If a system within a cluster should fail, other systems in the cluster are capable of carrying on the operations of the failed system with minimal interruption. This backup operational mode is known as failover. Failover may be part of a mission-critical system so that the system is fault tolerant. For example, failover may involve automatically offloading tasks to a standby system component so that the procedure remains seamless to the end user. Failover can apply to all aspects of a system. For example, within a network, failover may be a mechanism to protect against a failed connection, storage device or web server.

A failed system can be examined and repaired by an administrator. Once a repair is completed, the failed system can resume its original operations. The process of migrating a failed application back to its original system is known as failback.

The collection of systems which makes up a cluster may be interconnected via shared storage and network interfaces and an identical operating environment may be maintained within each system. To an end user, a cluster appears as if it is one system, although multiple systems may be reacting and responding to requests. Each computer system that is connected to a cluster may be referred to as a node. A node can send a message or "heartbeat" to another node to notify that node of its existence.

There exist a variety of approaches to clustering that vary from vendor to vendor and different clusters may run different applications. Presently, there is no single application program interface ("API") which can be applied across multiple cluster solutions. Some vendors have provided vendor specific APIs, but none have developed a common interface to multiple cluster solutions. Accordingly, there is a need for a common set of APIs that is capable of interfacing with multiple cluster solutions from multiple vendors so that the process of making an application highly available and capable of interacting with the cluster can be simplified.

SUMMARY

The present disclosure relates to a method for making an application including at least one application component highly available within a clustered environment, wherein the method may utilize a cluster service layer capable of supporting at least one cluster platform. The method comprises detecting a cluster on an installation node, verifying whether the at least one application component can be installed on the detected cluster, installing the at least one application component on the detected cluster, and putting the at least one application component online.

The present disclosure also relates to a computer recording medium including computer executable code for making an application including at least one application component highly available within a clustered environment, wherein the computer executable code may utilize a cluster service layer capable of supporting at least one cluster platform. The computer recording medium comprises code for detecting a cluster on an installation node, code for verifying whether the at least one application component can be installed on the detected cluster, code for installing the at least one application component on the detected cluster, and code for putting the at least one application component online.

The present disclosure also relates to a programmed computer system for making an application including at least one application component highly available within a clustered environment, wherein the programmed computer system may utilize a cluster service layer capable of supporting at least one cluster platform. The programmed computer system resides on a computer-readable medium and includes instructions for causing a computer to detect a cluster on an installation node, verify whether the at least one application component can be installed on the detected cluster, install the at least one application component on the detected cluster, and put the at least one application component online.

The present disclosure also relates to a programmed computer apparatus for making an application including at least one application component highly available within a clustered environment, wherein the programmed computer apparatus may utilize a cluster service layer capable of supporting at least one cluster platform. The programmed computer apparatus performs steps comprising detecting a cluster on an installation node, verifying whether the at least one application component can be installed on the detected cluster, installing the at least one application component on the detected cluster, and putting the at least one application component online.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

In describing preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Figure 1:
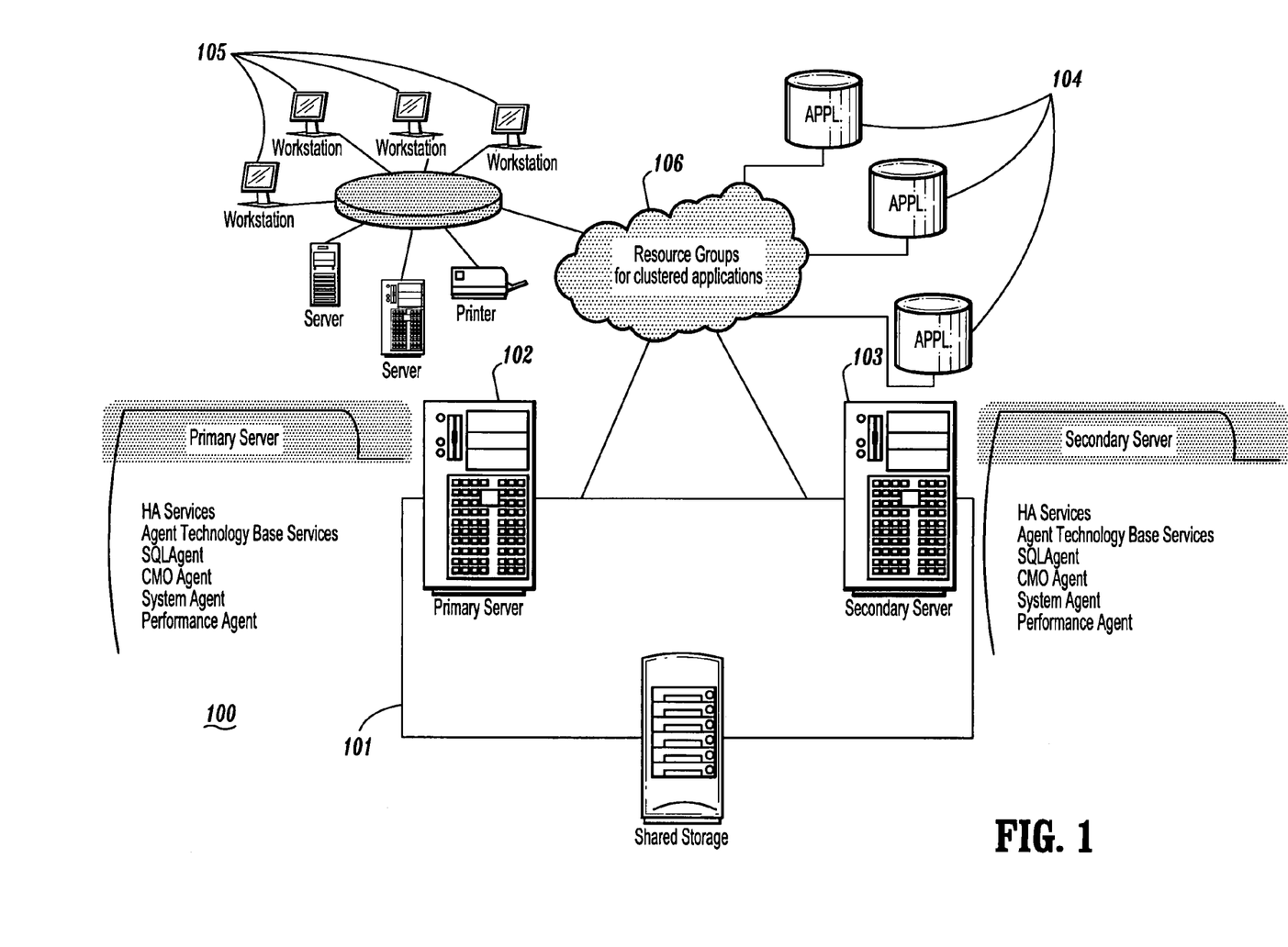
FIG. 1 shows an example of a computer system capable of implementing the method and system of the present disclosure.

FIG. 1 shows a sample configuration of a computer system to which the present disclosure may be applied. The system and method of the present disclosure may be implemented in the form of a software application running on a computer system, for example, a mainframe, personal computer (PC), handheld computer, server etc. The software application may be stored on a recording media locally accessible by the computer system, for example, floppy disk, compact disk, hard disk, etc., or may be remote from the computer system and accessible via a hard wired or wireless connection to a network, for example, a local area network, or the Internet.

Figure 2:
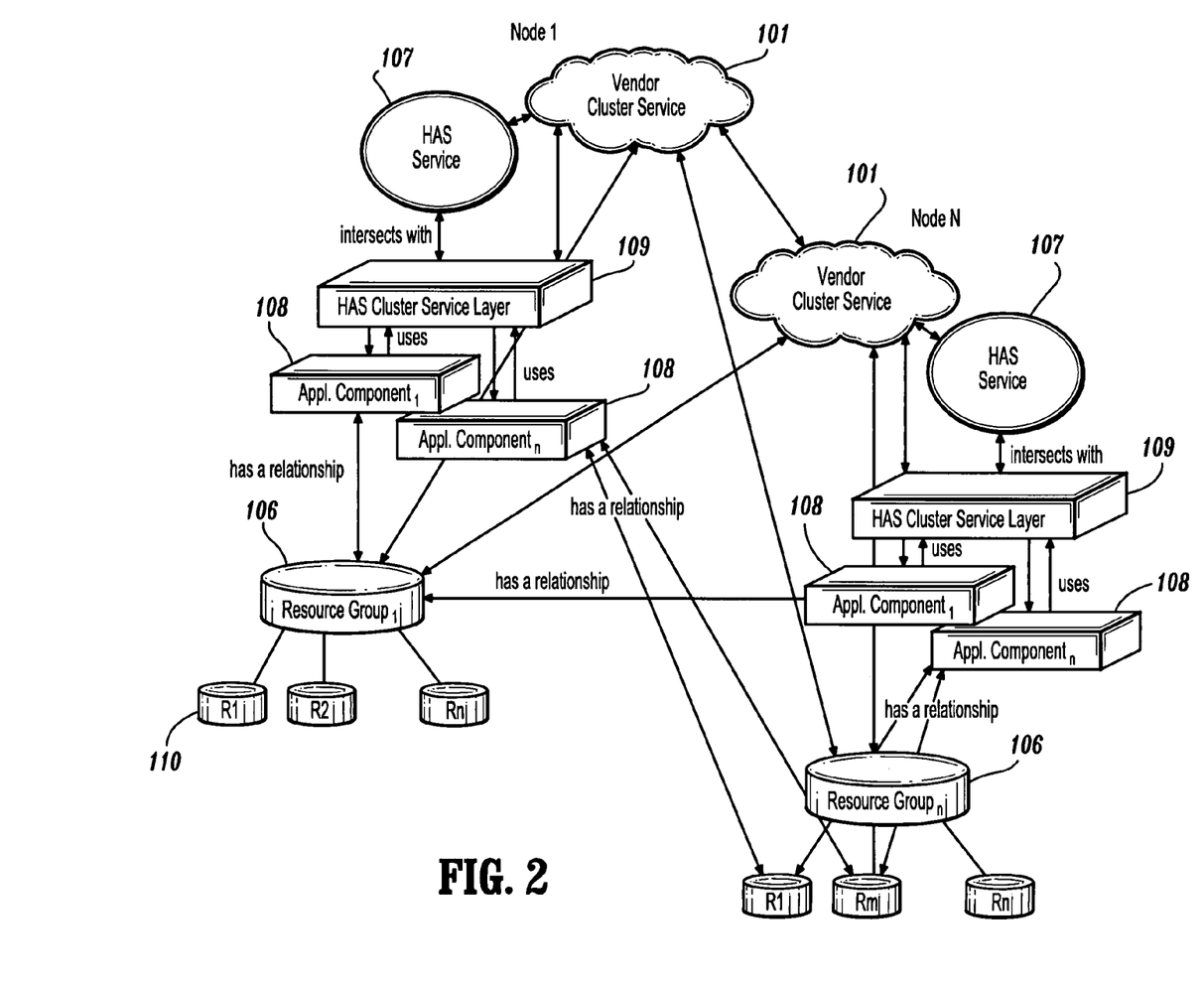
FIG. 2 shows a schematic representation of the method and system according to the present disclosure.

An example of a computer system capable of implementing the present method and system is shown in FIG. 1. The computer system referred to generally as system 100 may include a cluster server 101, such as for example, a Microsoft Cluster Service™ server or a Sun Cluster™ server, consisting of a primary server 102 and a secondary server 103. The primary and secondary servers 102, 103 may provide identical services, such as acting as structured query language ("SQL"), system and performance agents and performing high availability and agent technology base services. Any number of applications 104, for example an SQL server and Microsoft Exchange™ server, and workstations 105 may interact with the cluster server 101 via resource groups 106. As shown in FIG. 2, resources 110, for example, internet protocol ("IP") addresses, application images, disk drives, etc. may be organized into resource groups 106. A resource group 106 may be a logical organization of resources 110 in a single package or container. A resource group 106 may facilitate administration of a cluster resource 110 by maintaining all dependent resources in a single unit.

As shown in FIG. 2, the high availability service ("HAS") 107 may be a service/daemon that runs on all nodes$_{1\ to\ n}$ within a cluster. Application components 108, for example, agent technology common services, SQL agents, exchange agents, event management, workload management, etc., may use the HAS 107 to make requests via a cluster service layer ("CSL") 109. The CSL 109 may be a shared library or a dynamically loaded or dynamic-link library ("DLL") that application components 108 load upon start to determine whether they are operating in a cluster environment 101. If an application component 108 determines that it is operating in a cluster environment 101, maintenance of this operating status may be ensured through a combination of enhancements to common services and to the cluster 101 itself. Such all enhancement may include high availability to components which monitor SQL databases. Each application component 108 may have a relationship with at least one resource group 106 that may organize resources 110 into a single package.

Figure 3:
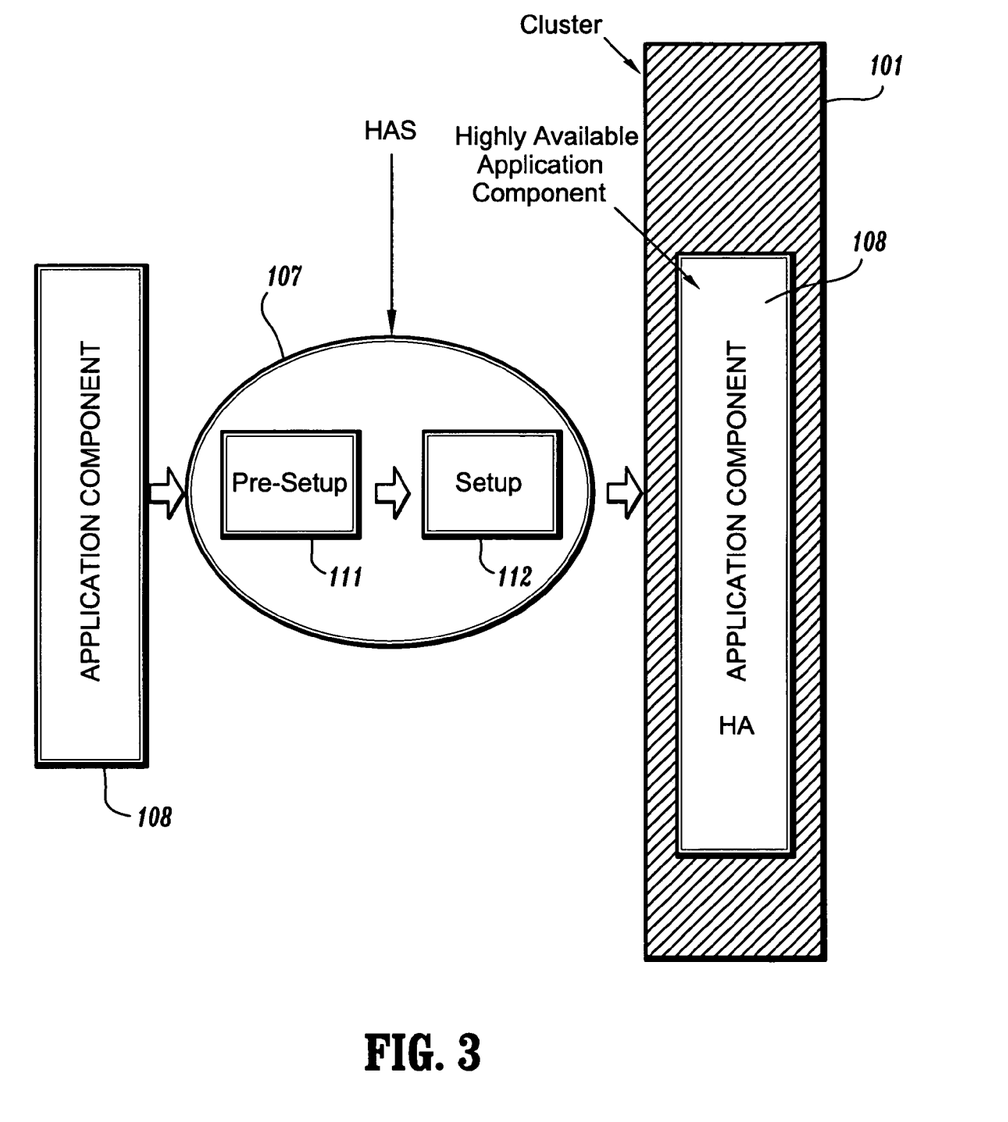
FIG. 3 shows a diagram of the method of making an application highly available according to the method and system of the present disclosure.

As shown in FIG. 3, the process of making an application component 108 highly available may involve a pre-setup step 111 and a set-up step 112. During the pre-setup step, it can be verified whether the application component 108 can be installed on the cluster 101. For example, an application 104 or application component 108 may compromise data or resource integrity of the system. Additionally, an application 104 or application component 108 may not be suitable for a clustered environment 101. Applications 104 or application components 108 that may be suitable for a cluster 101 can be easily restarted by implementing, for example, automatic integrity recovery, can be easily monitored, have a start and stop procedure, are moveable from one node to another in the event of failure, and depend on resources which can be made highly available and can be configured to work with an IP address. Queries may be designed to test for such features. After it is determined that the application component 108 can be installed on the cluster 101, the set-up step 112 may follow. During the set-up step 112, the application component 108 may be installed in the cluster 101, thereby making the application component 108 highly available. The installation of the application component 108 may include modifying the setup or configuration of an application component 108 to add hooks into the CSL 109, installing data files on shared disks and installing the application component 108 on all nodes of the cluster 101. Installation may also include installing all sub-components, such as binaries, COM, ActiveX™ components, etc. that are required to run a particular application component 108. The application component 108 and sub-components may also be registered with the cluster 101, which may include the step of creating resources 110 required by the application component 108, such as an IP address resource, a network name resource, etc. and the step of creating a resource group 106 for the application component 108 so that all resources required to run the application 104 can be grouped together. The resources 110 and resource groups 106 may be configured with the cluster 101, and such configuration may include providing a generalized set of function calls. The function calls may use the API calls of the cluster service 101, which can be provided by the cluster vendor. Once an application component 108 has been successfully installed, registered and configured, the application component 108 may be brought online in the cluster environment 101. the cluster environment 101.

Figure 4A:
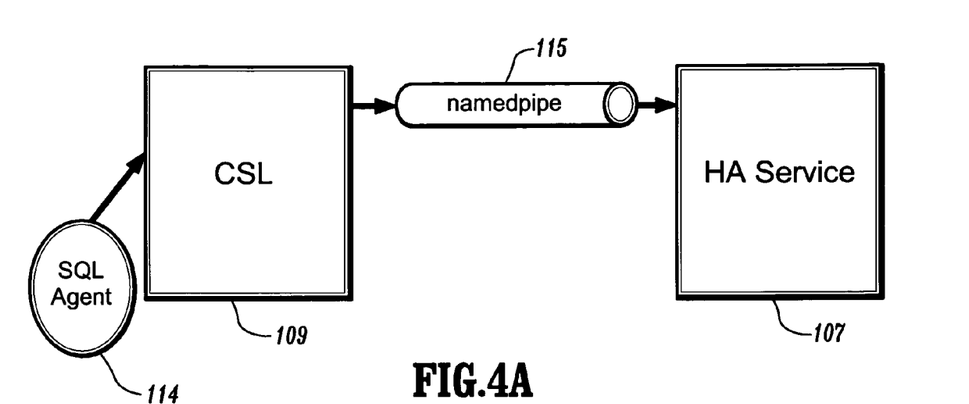
FIGS. 4A–4B show an example of communication between a cluster service, cluster service layer and a high availability service according to the method and system of the present disclosure.
Figure 4B:
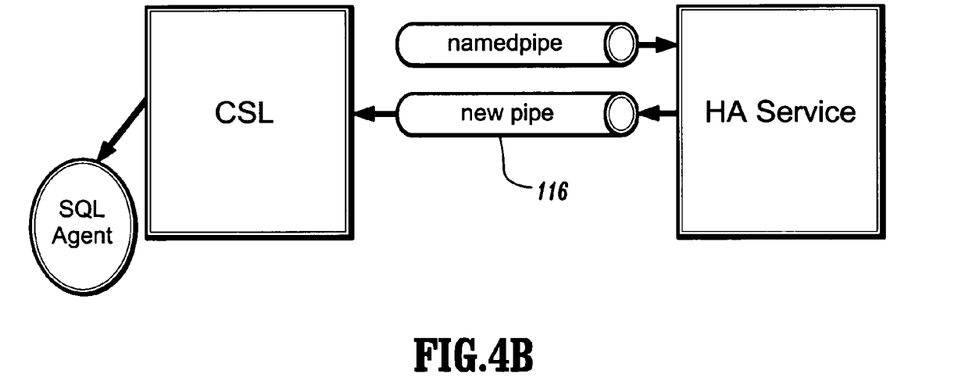

Application components 108 may use the CSL 109 to interact with the HAS 107 and the cluster server 101. As shown in FIGS. 4A–4B, communication may occur between the CSL 109 and the HAS 107. A communication may include a structured query about the status of an application component 108 in the cluster environment 101. As shown in FIG. 4A, the communication may be executed by an SQL Agent 114 and sent from the CSL 109 to the HAS 107 via a named pipe 115. As shown in FIG. 2, the HAS 107 can process the query, obtain an answer from the cluster service 101 and send a reply to the query via the same path in reverse. The query may request, for example, the status of a specified resource group 106, application component or components 108, etc. and information can be obtained as to whether a resource 110 is running on a particular node. The query may be a non-blocking call, meaning that a reply will return immediately. The query may also be a blocking call, meaning that a reply will return only when there is a change in status of the resource on a particular node. FIG. 4B illustrates a blocking call configuration, wherein the CSL 109 will wait until a new pipe 116 is created and block until the new pipe 116 is created. The HAS 107 will not create the new pipe 116 until a change in status of a specified resource group 106, application component or components 108, etc. occurs.

Figure 5:
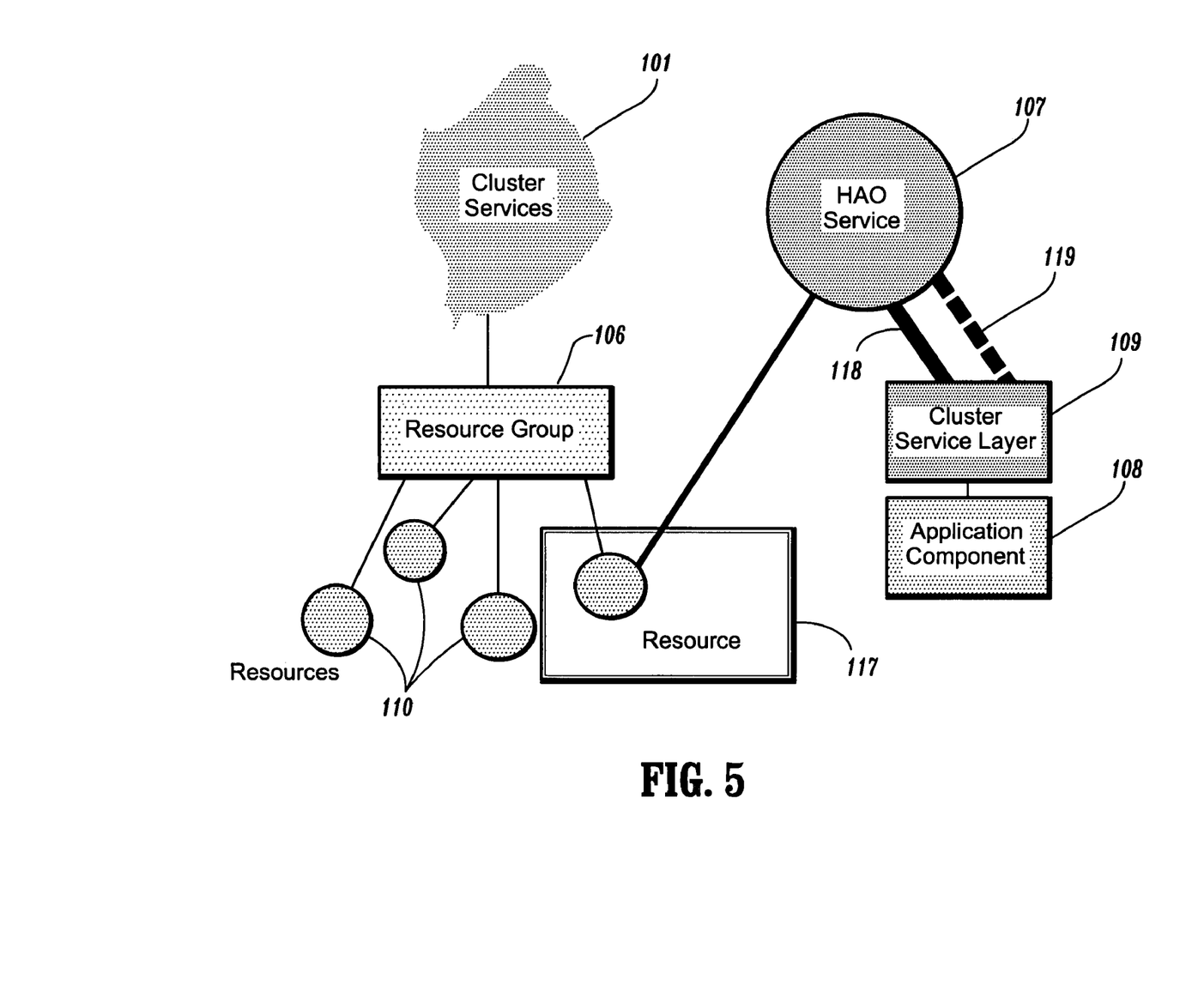
FIG. 5 shows an example of communication between a cluster service, cluster service layer and a high availability service according to the method and system of the present disclosure.

An alternative model for communication between a CSL 109, HAS 107 and the cluster service 101 is shown in FIG. 5. In this model, a resource 117 may be created in any resource group 106 that needs to be monitored. If the resource group 106 is brought offline, the resource 117 can notify the HAS 107 of the change and appropriate actions may be taken. During periodic time intervals, such as every 1–60 seconds, the HAS 107 can poll information from the cluster service 101 and determine If a change in status has occurred in any resource group 106. An application component 108 may communicate with the HAS 107 for registration, notification, etc. via the CSL 109 and the use of shared memory. When the HAS 107 is started, a shared memory region 118 may be created and used for communication between the CSL 109 and HAS 107. A separate shared memory region 119 may be created by the HAS 107 when an application component 108 requires blocking and non-blocking calls for large amounts of data.

The CSL 109 is an API that may be used by a software developer to make application components 108 highly available. The CSL 109 may support a variety of cluster platforms so that a developer cause the CSL API for each cluster platform instead of learning different APIs. The CSL 109 can have calls to check if an application 104 or application component 108 is running in a clustered environment 101, start the application 104 or application component if the application 104 or the application component 108 are not running, start the cluster service 101 if the cluster service 101 is not running, create or modify resources 110, such as IP addresses, cluster names, applications etc., create or modify resource groups 106, add or modify resource dependencies (e.g., if one resource 110 needs another resource 110 to be running before it can be started), get cluster information, such as cluster name, shared disks, node names, number of nodes, etc., put a resource 110 online or offline, and fail a resource 110. The use of the CSL 109 allows a highly available application 104 to interact with the cluster environment 101, thus making that application 104 cluster aware. The CSL 109 may be used by each application component 108 to check if the application component 108 is running in the cluster 101, check if the HAS 107 is running, register the application component 108 with the HAS 107, determine the state and location of the application component 108, create or modify resources 110 and dependencies, and retrieve information about the cluster 101, such as groups 106, resources 110, shared disks, etc.

As stated above, the CSL 109 may have a call to fail a resource 110. This occurs when a primary system component, such as a processor, server, network, database, etc., becomes unavailable through either failure or scheduled down time. Tasks, such as application components 108, resources 110, etc. can automatically be offloaded to a secondary system component having the same function as the primary system component so that there is little or no interruption of a procedure. A failed application 104 may be migrated back to its original node upon repair or completion of down time of a system component.

Figure 6:
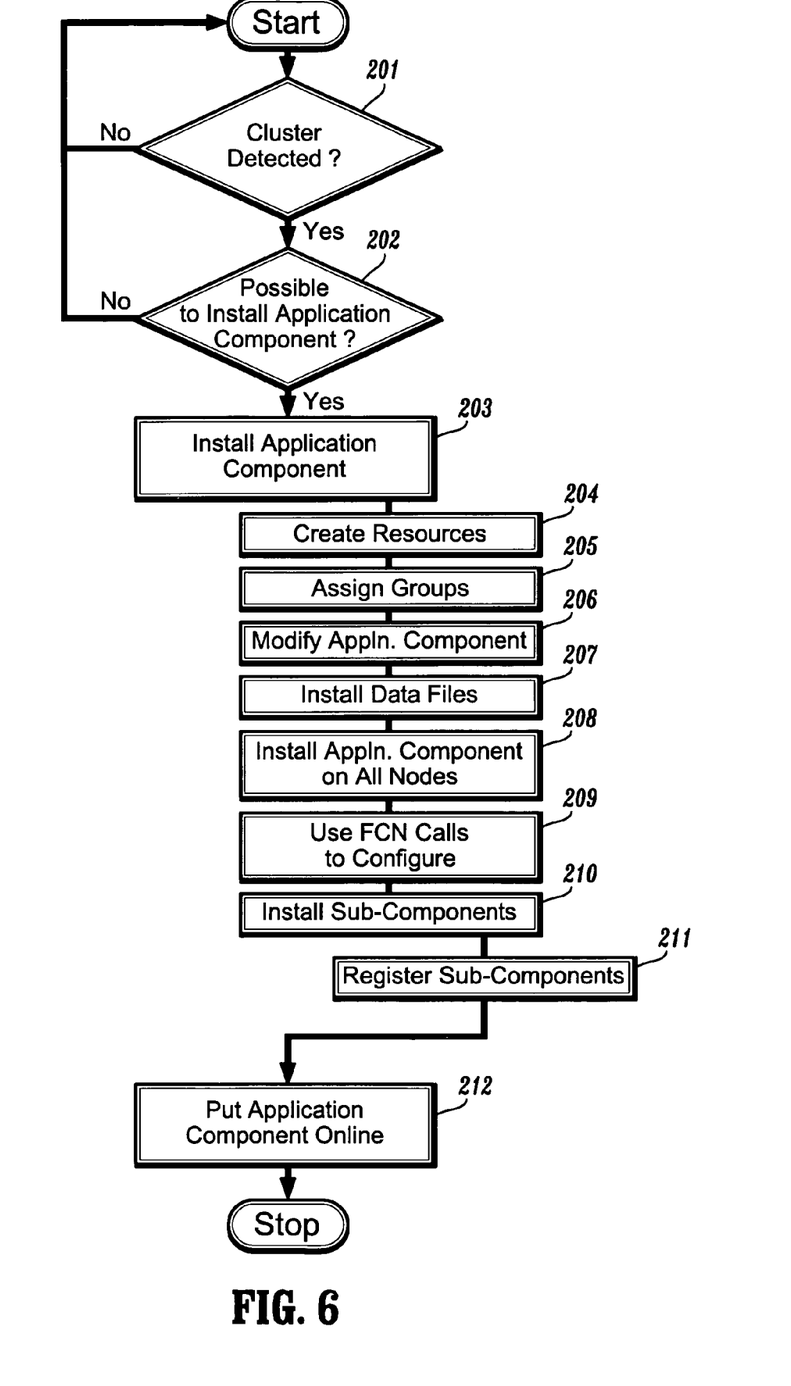
FIG. 6 shows a flow chart of installation of an application component onto a cluster according to the method and system of the present disclosure.

FIG. 6 shows a method of installation of an application component 108 onto a cluster 101. In Step 201 it is determined whether a cluster 101 has been detected, for example, by a query. If a cluster 101 is detected, Step 202 verifies that it is possible to install the application component 108 onto the cluster 101. Verification may include determining whether an application 104 or application component 108 has certain characteristics, for example, that the application 104 or application component does not compromise data or resource integrity of the system, can be easily restarted by implementing, for example, automatic integrity recovery, can be easily monitored, has a start and stop procedure, is moveable from one node to another in the event of failure, and depends on resources which can be made highly available, and/or can be configured to work with an IP address, etc. Once it has been verified that the application component 108 can be installed, the application component 108 is installed (Step 203). Installation of the application component 108 may involve performing one or more steps including creating resources 106 for the application component 108 (Step 204), assigning the application component 108 to a group 106 (Step 205), modifying the application component 108 to, for example, add hooks into the cluster service layer 109 (Step 206), installing data files required by the application component 108 (Step 207), installing the application component 108 on all nodes of the cluster 101 (Step 208), using function calls to configure the application component 108 to the cluster 101 (Step 209), installing sub-components required to run the application component 108 (Step 210), and registering the sub-components with the cluster 10 (Step 211). Upon successful installation of the application component 108, the application component 108 can be put online (Step 212).

The present system and method thus provides an efficient and convenient way for making an application highly available within a clustered environment, the method utilizing a cluster service layer capable of supporting more than one cluster platform. Numerous additional modifications and variations of the present disclosure are possible in view of the above-teachings. It is therefore to be understood that within the scope of the appended claims, the present disclosure may be practiced other than as specifically described herein.

What is claimed is:

1. A method for making an application including at least one application component, highly available within a clustered environment, comprising:
    using a cluster service layer to query of one or more system components to determine that a plurality of servers comprise a cluster on an installation node, the cluster service layer operable to support a plurality of cluster platforms from a plurality of vendors;
    determining that the at least one application component is suitable for installation on the detected cluster;
    installing the at least one application component on the detected cluster; putting the at least one application component online; and
    making the at least one application component highly available.

2. The method as recited in claim 1, further comprising creating resources for the at least one application component.

3. The method as recited in claim 1, further comprising assigning the at least one application component to a group.

4. The method as recited in claim 1, wherein the method utilizes a cluster service layer capable of supporting at least one cluster platform and further comprising modifying the at least one application component to add hooks into the cluster service layer.

5. The method as recited claim 1, further comprising installing data files required by the at least one application component.

6. The method as recited in claim 1, further comprising installing the at least one application component on all nodes of the detected cluster.

7. The method as recited in claim 1, further comprising using function calls to configure the application to the detected cluster.

8. The method as recited in claim 7, wherein the function calls use the API calls of the detected cluster for configuring the application to the detected cluster.

9. The method as recited in claim 1, further comprising monitoring the health of the at least one application component.

10. The method as recited in claim 1, further comprising restarting the at least one application component in the event of one of failure and unavailability of the at least one application component.

11. The method as recited in claim 1, further comprising migrating the at least one application component from a first node to a second node in the event of one of failure and unavailability of the at least one application component on the first node.

12. The method as recited in claim 11, further comprising returning the at least one application component to the first node.

13. The method as recited in claim 1, further comprising putting the at least one application component offline.

14. The method as recited in claim 1, further comprising:
   installing sub-components that are required to run the at least one application component; and
   registering the sub-components with the detected cluster.

15. The method as recited in claim 1, wherein the method utilizes a cluster service layer capable of supporting at least one cluster platform and wherein the cluster service layer includes at least one of a call for checking if one of the application and the at least one application component are running in the clustered environment, a call for starting the application if the application is not running, a call for starting the at least one application component if the at least one application component is not running, a call for starting a cluster service if the cluster service is not running, a call for creating resources, a call for creating groups, a call for adding resource dependencies, a call for obtaining cluster information, a call for putting a resource one of online and offline and a call for failing the resource.

16. The method as recited in claim 1, wherein the method utilizes a cluster service layer capable of supporting at least one cluster platform and wherein one of the application and the at least one application component use the cluster service layer to interact with the detected cluster.

17. The method as recited in claim 1, wherein the method utilizes a cluster service layer capable of supporting at least one cluster platform and wherein the at least one application component uses the cluster service layer to register the at least one installed application component with a high availability daemon.

18. The method as recited in claim 1, wherein the method utilizes a cluster service layer capable of supporting at least one cluster platform and wherein the at least one application component uses the cluster service layer to determine whether a high availability daemon is running.

19. The method as recited in claim 1, wherein the method utilizes a cluster service layer capable of supporting at least one cluster platform and wherein the at least one application component uses the cluster service layer to interact with the detected cluster to one of create and modify resources or dependencies.

20. The method as recited in claim 1, wherein the method utilizes a cluster service layer capable of supporting at least one cluster platform and wherein the at least one application component uses the cluster service layer to interact with the detected cluster to retrieve information about the detected cluster.

21. The method as recited in claim 1, wherein the method utilizes a cluster service layer capable of supporting at least one cluster platform and wherein the at least one application component uses the cluster service layer to determine whether the at least one application component is running in the detected cluster.

22. The method as recited in claim 1, wherein the method utilizes a cluster service layer capable of supporting at least one cluster platform and wherein the at least one application component uses the cluster service layer to determine one of the state and location of the at least one application component.

23. The method as recited in claim 1, wherein determining that the application component is suitable for installation on the cluster comprises determining that the at least one application component exhibits a characteristic selected from the group consisting of:
   the at least one application component does not compromise data and resource integrity of a computing system,
   the at least one application component can be easily restarted, the at least one application component can be easily monitored,
   the at least one application component has a start and stop procedure,
   the at least one application component is moveable from one node to another in the event of a failure of a node,
   the at least one application depends on resources that are highly available, and
   the at least one application can be configured to work with an IP address.

24. The method of claim 1, wherein the at least one application component is determined to be suitable for installation on the detected cluster based on at least one characteristic of the application component.

25. A computer recording medium including computer executable code for making an application including at least one application component highly available within a clustered environment, the computer recording medium comprising:
   code for using a cluster service layer to query of one or more system components to determine that a plurality of servers comprise a cluster on an installation node, the cluster service layer operable to support a plurality of cluster platforms from a plurality of vendors;
   code for determining that the at least one application component is suitable for installation on the detected cluster;
   code for installing the at least one application component on the detected cluster;
   code for putting the at least one application component online; and
   code for making the at least one application component highly available.

26. The computer recording medium as recited in claim 25, further comprising:
   code for creating resources for the at least one application component.

27. The computer recording medium as recited in claim 25, further comprising:
   code for assigning the at least one application component to a group.

28. The computer recording medium as recited in claim 25, wherein the computer executable code utilizes a cluster service layer capable of supporting at least one cluster platform and further comprising:
 code for modifying the at least one application component by adding hooks into the cluster service layer.

29. The computer recording medium as recited in claim 25, further comprising:
 code for installing data files required by the at least one application component.

30. The computer recording medium as recited in claim 25, further comprising:
 code for installing the at least one application component on all nodes of the detected cluster.

31. The computer recording medium as recited in claim 25, further comprising:
 code for using function calls to configure the at least one application component to the cluster.

32. The computer recording medium as recited in claim 31, wherein the function calls use the API calls of the detected cluster for configuring the application to the detected cluster.

33. The computer recording medium as recited in claim 25, further comprising:
 code for monitoring the health of the at least one application component.

34. The computer recording medium as recited in claim 25, further comprising:
 code for restarting the at least one application component in the event of one of failure and unavailability of the at least one application component.

35. The computer recording medium as recited in claim 25, further comprising:
 code for migrating the at least one application component from a first node to a second node in the event of one of failure and unavailability of the at least one application component on the first node.

36. The computer recording medium as recited in claim 35, further comprising:
 code for returning the at least one application component to the first node.

37. The computer recording medium as recited in claim 25, further comprising:
 code for putting the at least one application component offline.

38. The computer recording medium as recited in claim 25, further comprising:
 code for installing sub-components that are required to run the at least one application component; and
 code for registering the sub-components with the detected cluster.

39. The computer recording medium as recited in claim 25, wherein the computer executable code utilizes a cluster service layer capable of supporting at least one cluster platform and wherein the cluster service layer includes at least one of a call for checking if one of the application and the at least one application component are running in the clustered environment, a call for starting the application if the application is not running, a call for starting the at least one application component if the at least one application component is not running, a call for starting a cluster service if the cluster service is not running, a call for creating resources, a call for creating groups, a call for adding resource dependencies, a call for obtaining cluster information, a call for putting a resource one of online and offline and a call for failing the resource.

40. The computer recording medium as recited in claim 25, wherein the computer executable code utilizes a cluster service layer capable of supporting at least one cluster platform and wherein one of the application and the at least one application component use the cluster service layer to interact with the detected cluster.

41. The computer recording medium as recited in claim 25, wherein the computer executable code utilizes a cluster service layer capable of supporting at least one cluster platform and wherein the at least one application component uses the cluster service layer to register the at least one installed application component with a high availability daemon.

42. The computer recording medium as recited in claim 25, wherein the computer executable code utilizes a cluster service layer capable of supporting at least one cluster platform and wherein the at least one application component uses the cluster service layer to determine whether a high availability daemon is running.

43. The computer recording medium as recited in claim 25, wherein the computer executable code utilizes a cluster service layer capable of supporting at least one cluster platform and wherein the at least one application component uses the cluster service layer to interact with the detected cluster to one of create and modify resources or dependencies.

44. The computer recording medium as recited in claim 25, wherein the computer executable code utilizes a cluster service layer capable of supporting at least one cluster platform and wherein the at least one application component uses the cluster service layer to interact with the detected cluster to retrieve information about the detected cluster.

45. The computer recording medium as recited in claim 25, wherein the computer executable code utilizes a cluster service layer capable of supporting at least one cluster platform and wherein the at least one application component uses the cluster service layer to determine whether the at least one application component is running in the detected cluster.

46. The computer recording medium as recited in claim 25, wherein the computer executable code utilizes a cluster service layer capable of supporting at least one cluster platform and wherein the at least one application component uses the cluster service layer to determine one of the state and location of the at least one application component.

47. The computer recording medium as recited in claim 25, wherein the code for determining that the application component is suitable for installation on the cluster comprises code for determining that the at least one application component exhibits a characteristic selected from the group consisting of:
 the at least one application component does not compromise data and resource integrity of a computing system,
 the at least one application component can be easily restarted, the at least one application component can be easily monitored,
 the at least one application component has a start and stop procedure,
 the at least one application component is moveable from one node to another in the event of a failure of a node,
 the at least one application depends on resources that are highly available, and
 the at least one application can be configured to work with an IP address.

48. The computer recording medium as recited in claim 25, wherein the code for determining that the at least one application component is suitable for installation on the detected cluster comprises code for determining based on at least one characteristic of the application component that the at least one application component is suitable for installation on the detected cluster.

49. Logic for making an application including at least one application component highly available within a clustered environment, the logic encoded in a storage medium and comprising instructions for causing a computer to perform the following operations:
- use a cluster service layer to query of one or more system components to determine that a plurality of servers comprise a cluster on an installation node, the cluster service layer operable to support a plurality of cluster platforms from a plurality of vendors;
- determine that the at least one application component is suitable for installation on the detected cluster;
- install the at least one application component on the detected cluster;
- put the at least one application component online; and
- make the at least one application component highly available.

50. The logic as recited in claim 49, further comprising instructions for causing a computer to perform the following operation:
- create resources for the at least one application component.

51. The logic as recited in claim 49, further comprising instructions for causing a computer to perform the following operation:
- assign the at least one application component to a group.

52. The logic as recited in claim 49, wherein the logic utilizes a cluster service layer capable of supporting at least one cluster service platform and further comprising instructions for causing a computer to perform the following operation:
- modify the at least one application component by adding hooks into the cluster service layer.

53. The logic as recited in claim 49, further comprising instructions for causing a computer to perform the following operation:
- install data files required by the at least one application component.

54. The logic as recited in claim 49, further comprising instructions for causing a computer to perform the following operation:
- install the at least one application component on all nodes of the detected cluster.

55. The logic as recited in claim 49, further comprising instructions for causing a computer to perform the following operation:
- use function calls to configure the application to the detected cluster.

56. The logic as recited in claim 55, wherein the function calls use the API calls of the detected cluster for configuring the application to the detected cluster.

57. The logic as recited in claim 49, further comprising instructions for causing a computer to perform the following operation:
- monitor the health of the at least one application component.

58. The logic as recited in claim 49, further comprising instructions for causing a computer to perform the following operation:
- restart the at least one application component in the event of one of failure and unavailability of the at least one application component.

59. The logic as recited in claim 49, further comprising instructions for causing a computer to perform the following operation:
- migrate the at least one application component from a first node to a second node in the event of one of failure and unavailability of the at least one application component on the first node.

60. The logic as recited in claim 59, further comprising instructions for causing a computer to perform the following operation:
- return the at least one application component to the first node.

61. The logic as recited in claim 49, further comprising instructions for causing a computer to perform the following operation:
- put the at least one application component offline.

62. The logic as recited in claim 49, further comprising instructions for causing a computer to perform the following operations:
- install sub-components that are required to run the at least one application component; and
- register the sub-components with the detected cluster.

63. The logic as recited in claim 49, wherein the logic utilizes a cluster service layer capable of supporting at least one cluster service platform and wherein the cluster service layer includes at least one of a call for checking if one of the application and the at least one application component are running in the clustered environment, a call for starting the application if the application is not running, a call for starting the at least one application component if the at least one application component is not running, a call for starting a cluster service if the cluster service is not running, a call for creating resources, a call for creating groups, a call for adding resource dependencies, a call for obtaining cluster information, a call for putting a resource one of online and offline and a call for failing the resource.

64. The logic as recited in claim 49, wherein the logic utilizes a cluster service layer capable of supporting at least one cluster service platform and wherein one of the application and the at least one application component use the cluster service layer to interact with the detected cluster.

65. The logic as recited in claim 49, wherein the logic utilizes a cluster service layer capable of supporting at least one cluster service platform and wherein the at least one application component uses the cluster service layer to register the at least one installed application component with a high availability daemon.

66. The logic as recited in claim 49, wherein the logic utilizes a cluster service layer capable of supporting at least one cluster service platform and wherein the at least one application component uses the cluster service layer to determine whether a high availability daemon is running.

67. The logic as recited in claim 49, wherein the logic utilizes a cluster service layer capable of supporting at least one cluster service platform and wherein the at least one application component uses the cluster service layer to interact with the detected cluster to one of create and modify resources or dependencies.

68. The logic as recited in claim 49, wherein the logic utilizes a cluster service layer capable of supporting at least one cluster service platform and wherein the at least one application component uses the cluster service layer to interact with the detected cluster to retrieve information about the detected cluster.

69. The logic as recited in claim 49, wherein the logic utilizes a cluster service layer capable of supporting at least one cluster service platform and wherein the at least one application component uses the cluster service layer to determine whether the at least one application component is running in the detected cluster.

70. The logic as recited in claim 49, wherein the logic utilizes a cluster service layer capable of supporting at least one cluster service platform and wherein the at least one application component uses the cluster service layer to determine one of the state and location of the at least one application component.

71. The logic as recited in claim 49, wherein the logic is operable to determine that the application component is suitable for installation on the cluster by determining that the at least one application component exhibits a characteristic selected from the group consisting of:
   the at least one application component does not compromise data and resource integrity of a computing system,
   the at least one application component can be easily restarted, the at least one application component can be easily monitored,
   the at least one application component has a start and stop procedure,
   the at least one application component is moveable from one node to another in the event of a failure of a node,
   the at least one application depends on resources that are highly available, and
   the at least one application can be configured to work with an IP address.

72. The logic as recited in claim 49, wherein the logic further comprises instructions to determine that the at least one application component is suitable for installation on the detected cluster based on at least one characteristic of the application component.

73. A method for making an application highly available within a clustered environment, comprising:
   providing a cluster service layer for managing a plurality of cluster platforms from a plurality of vendors, each cluster platform comprising a plurality of servers for the maintenance of a plurality of applications within a computer system;
   identifying at least one application component associated with an application for installation on a selected one of the plurality of cluster platforms;
   using the cluster service layer to:
      detect, by query, a selected cluster platform for installation of the at least one application component; and
      determine that the at least one application component is suitable for installation on the selected cluster platform;
   installing the at least one application component on the selected cluster platform;
   placing the at least one application component online; and
   making the at least one application component highly available.

74. The method as recited in claim 73, wherein determining that the application component is suitable for installation on the cluster platform comprises determining that the at least one application component exhibits a characteristic selected from the group consisting of:
   the at least one application component does not compromise data and resource integrity of a computing system,
   the at least one application component can be easily restarted, the at least one application component can be easily monitored,
   the at least one application component has a start and stop procedure,
   the at least one application component is moveable from one node to another in the event of a failure of a node,
   the at least one application depends on resources that are highly available, and
   the at least one application can be configured to work with an IP address.

75. The method as recited in claim 73, further comprising creating resources for the at least one application component.

76. The method as recited in claim 73, wherein the method further comprising modifying the at least one application component to add hooks into the cluster service layer.

77. The method as recited in claim 73, further comprising installing the at least one application component on all nodes of the selected cluster platform.

78. The method as recited in claim 73, further comprising using function calls to configure the application to the selected cluster platform.

79. The method as recited in claim 78, wherein the function calls use the API calls of the selected cluster platform for configuring the application to the selected cluster platform.

80. The method as recited in claim 73, further comprising monitoring the health of the at least one application component.

81. The method as recited in claim 73, further comprising restarting the at least one application component in the event of one of failure and unavailability of the at least one application component.

82. The method as recited in claim 73, further comprising migrating the at least one application component from a first node to a second node in the event of one of failure and unavailability of the at least one application component on the first node.

83. The method as recited in claim 82, further comprising returning the at least one application component to the first node.

84. The method as recited in claim 73, further comprising:
   installing sub-components that are required to run the at least one application component; and
   registering the sub-components with the selected cluster platform.

85. The method as recited in claim 73, wherein the cluster service layer includes at least one of a call for checking if one of the application and the at least one application component are running in the clustered environment, a call for starting the application if the application is not running, a call for starting the at least one application component if the at least one application component is not running, a call for starting a cluster service if the cluster service is not running, a call for creating resources, a call for creating groups, a call for adding resource dependencies, a call for obtaining cluster information, a call for puffing a resource one of online and offline and a call for failing the resource.

86. The method as recited in claim 73, wherein the one of the application and the at least one application component use the cluster service layer to interact with the detected cluster platform.

87. The method as recited in claim 73, wherein the at least one application component uses the cluster service layer to register the at least one installed application component with a high availability daemon.

88. The method as recited in claim 73, wherein the at least one application component uses the cluster service layer to determine whether a high availability daemon is running.

89. The method as recited in claim 73, wherein the at least one application component uses the cluster service layer to interact with the detected cluster platform to retrieve information about the selected cluster platform.

90. The method as recited in claim 73, wherein the at least one application component uses the cluster service layer to determine whether the at least one application component is running in the selected cluster platform.

91. The method as recited in claim 73, wherein the at least one application component uses the cluster service layer to determine one of the state and location of the at least one application component.

* * * * *